Aug. 2, 1966 J. P. CONKLIN 3,264,630

MIS-FEED DETECTING SYSTEM

Original Filed June 5, 1961 3 Sheets-Sheet 1

INVENTOR.
JOSEPH PATRICK CONKLIN
BY
William W. Seltow Jr.
ATTORNEY

Aug. 2, 1966 J. P. CONKLIN 3,264,630

MIS-FEED DETECTING SYSTEM

Original Filed June 5, 1961 3 Sheets-Sheet 2

INVENTOR.
JOSEPH PATRICK CONKLIN
BY William W. Voltow Jr.
ATTORNEY

Aug. 2, 1966 J. P. CONKLIN 3,264,630

MIS-FEED DETECTING SYSTEM

Original Filed June 5, 1961 3 Sheets-Sheet 3

INVENTOR.
JOSEPH PATRICK CONKLIN
BY
William W. Holton Jr.
ATTORNEY 3,264,630
United States Patent Office
Patented August 2, 1966

3,264,630
MIS-FEED DETECTING SYSTEM
Joseph Patrick Conklin, Fairfield, Conn., assignor to Pitney-Bowes, Inc., Stamford, Conn., a corporation of Delaware
Continuation of application Ser. No. 114,696, June 5, 1961. This application Mar. 16, 1964, Ser. No. 353,650
4 Claims. (Cl. 340—259)

This invention relates to an apparatus and method for detecting mis-feeds among checks or other documents being fed and, more particularly to an improvement over the mis-feed detecting apparatus and method disclosed in U.S. Patent No. 2,973,202 granted on February 28, 1961, to R. E. Schmeck et al.

This application is a continuation of prior copending application Serial No. 114,696, filed June 5, 1961, and now abandoned.

When feeding a multiple number of checks or other documents simultaneously in end to end spaced relation in cyclical sequence between a starting position and one or more operating positions, one or more of the documents may occasionally arrive at an operating position out of time, i.e., early or late. When the degree to which the document is out of time exceeds a particular tolerance, a jam may occur leading to the possibility of damage not only to the documents being fed but also to the feeding and/or other operating mechanism. As disclosed in the above-noted U.S. patent, jam prevention is accomplished by providing sensing means at a determined location along the document feed path; which sensing means causes an error signal to be produced whenever a space between two successive documents fails to be sensed at a determined time when this space is due at that determined location. This error signal indicates that a jam may be imminent and is utilized to stop the operation of the document feeding means thereby preventing the occurrence of a jam.

With the present invention, however, mis-feed detection is accomplished by providing sensing means at a determined location along the document feed path; which sensing means causes a storage means to be set when a space between two successive documents fails to be sensed at a determined time during the feeding of each document. No error signal is produced at this time, feeding of the documents continues, and the sensing means continues to sense for a space between two successive documents. The storage means is arranged to be reset, once it is set, whenever a space between documents being fed is sensed by the sensing means. If a space between documents fails to be sensed by the sensing means during a determined time interval after setting of the storage means, an error signal is produced. This error signal indicates that a mis-feed has occurred and may be utilized to stop the operation of the document feeding means. If, however, the storage means is reset before said determined time interval terminates, no stop signal is produced and feeding of the documents continues without interruption.

It will be apparent that with a mis-feed detecting apparatus that produces a mis-feed indicating signal whenever a space between successively fed documents of uniform length fails to be sensed at a time when such a space is due at the sensing location, the maximum tolerance (i.e., the maximum amount by which each document can lead or trail its on-time position without causing a mis-feed indicating signal) is equal to the length (in the direction of feeding) of the space between each two successively fed on-time documents. In this regard, if any document being fed varies from its on-time position by an amount greater than the length of this space, a space between successively fed documents will necessarily fail to be sensed when due at the sensing location and a mis-feed indicating signal will be produced. Furthermore, if the length of the successively fed documents varies, the maximum tolerance will be the minimum length of space between successive documents (as occurs between the trail edge of the longest possible document and the lead edge of the next succeeding document). It sometimes, if not frequently, occurs, however, that the tolerance of the means for operating on the documents being fed (such, for example, as sorting mechanism) is greater than the minimum (or uniform) length of the space between the successively fed on-time documents. With the present invention, the maximum tolerance can readily be adjusted to an amount substantially greater as well as substantially smaller than the minimum length of space between the successively fed on-time documents; all as will become apparent as the description proceeds.

Accordingly, an object of the present invention is to provide a new and improved apparatus and method for detecting document mis-feeds.

A further object of this invention is to provide such an apparatus and method which are readily capable of accommodating a wide range of degree of mis-feeds.

Another object is to provide such an apparatus and method which are dependable and efficient in operation.

A further object of the invention is to provide such an apparatus and method for detecting mis-feeds such as jams, stream feeding, feeding of documents that are oversize in the direction of feeding, and documents being fed out-of-time.

Further objects and advantages will become apparent as the description proceeds.

Several embodiments of the invention are shown in the accompanying drawing wherein.

Figure 1:
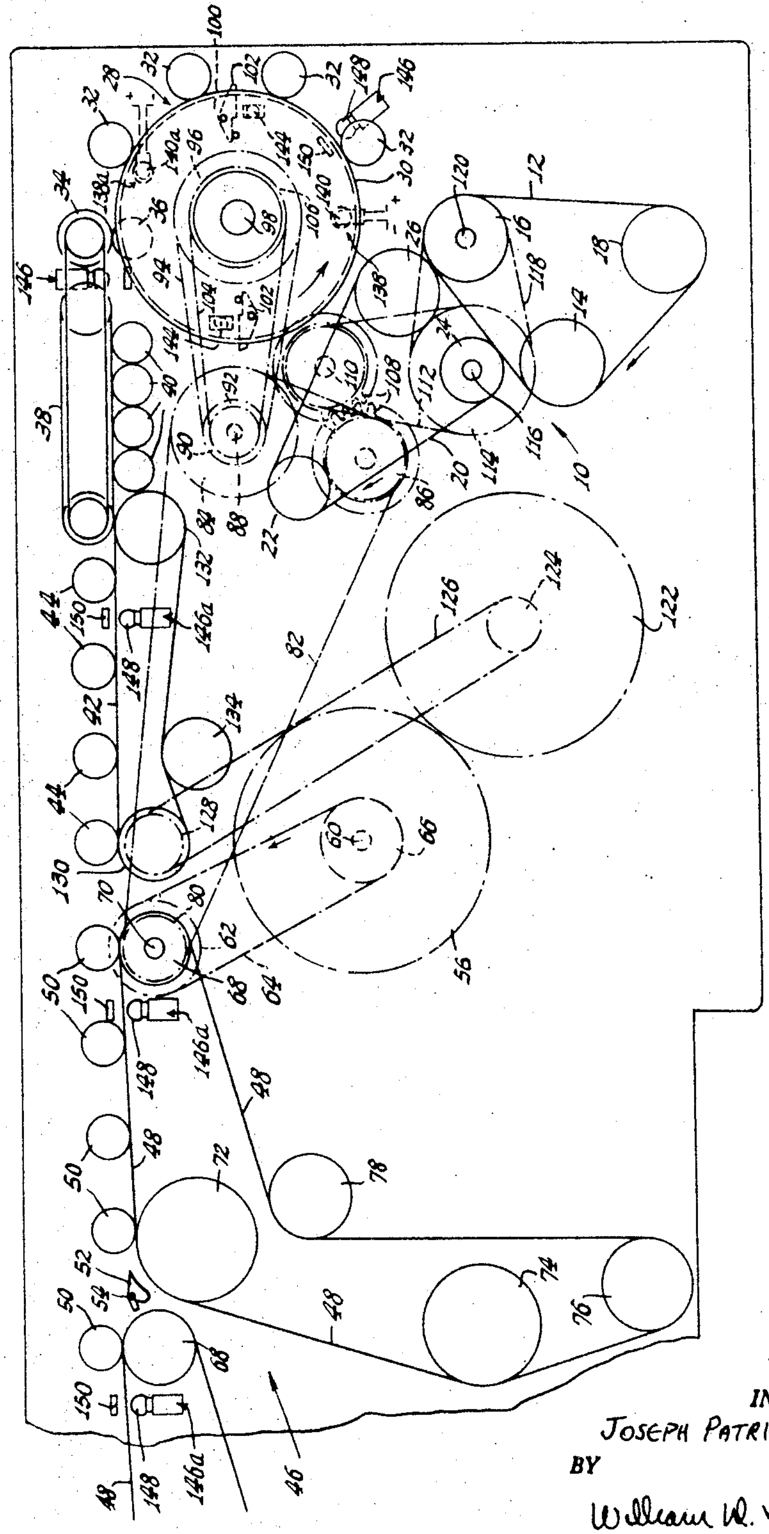
FIG. 1 is a fragmentary, more or less diagrammatic plan view of a document feeding and sorting machine which incorporates timing and sensing devices for mis-feed detection according to the present invention.

Referring to the drawing, FIG. 1 diagrammatically shows a sorting apparatus including a separating and feeding unit generally indicated at 10 for separating documents such as checks from a stack and for feeding the checks forwardly in one-by-one succession. More particularly, the separating and feeding unit 10 includes check advancing belts 12 continuously driven in the direction of the arrow in FIG. 1 about pulleys 14, 16 and 18. The unit 10 also includes separating belts 20 continuously driven in the direction of the arrow in FIG. 1 about pulleys 22, 24 and 26. For details, in addition to those set forth herein, of the check separating and feeding unit and the remaining parts of the feeding and sorting machine shown in FIG. 1, reference may be had to the above-noted U.S. patent and to U.S. Patent No. 2,977,114 granted on March 28, 1961, to W. J. Hanson et al.

The checks are fed from the separating and feeding unit 10 in end to end spaced relation in cyclical sequence to a synchronizer generally indicated at 28. The synchronizer 28 includes a synchronizer disc 30 and idler rollers 32 between which the checks are fed in cyclical sequence. After passing from between the synchronizer disc 30 and the uppermost one of the idler rollers 32 (as viewed in FIG. 1), the checks are fed to the left (again as viewed in FIG. 1) in succession and along substantially a straight line between driven roller 34 and idler 36, between driven belts 38 and idler rollers 40, between driven belts 42 and idler rollers 44, and then to one of a plurality of successive stacker stations designated by the reference numeral 46 (only one of the latter being shown in FIG. 1). Each stacker station 46 includes driven belts 48, and each successive check is fed between the belts 48 and idler rollers 50 to a check deflecting element 52. When the deflecting element 52 is in the position shown in FIG. 1, the next successive check fed between belts 48 and idler rollers 50 will be deflected downwardly (as viewed in FIG. 1) to a first stacker (not shown). When, however, the deflecting element 52 is pivoted about an axis 54 to a clockwise position, the next successive check will continue to feed to the left to the next stacker unit. It will be clear that the number of stacker units 46 that are provided is determined by the particular installation.

A motor indicated at 56 drives a shaft 60 which, in turn, drives a pulley 62 through a belt 64 and a pulley 66 fixed on the shaft 60. The stacker feed belts 48 are driven by a pulley 68 fixed, along with the pulley 62, on a shaft 70. As can be seen in FIG. 1, stacker feed belts 48 are entrained about idler pulleys 72, 74, 76 and 78 as well as about driven pulley 68. A third pulley 80 fixed on the shaft 70 drives a belt 82 which is also entrained about two pulley wheels 84 and 86, respectively. Pulley 84 is fixed on a shaft 88 to drive two pulleys 90 and 92, respectively. Pulley 90 drives a belt 94 and a pulley 96 fixed on a shaft 98 to drive a pair of discs 100 which carry two sets of paddles 102. Each set of paddles is carried by discs 100 in diametrically opposed relation to the other set, and each set includes one paddle directly above another. Pulley 92 drives a belt 104 and a pulley 106, the latter being rotatable about the shaft 98 with and fixed to the synchronizer disc 30. Through gearing shown at 108, the pulley 86 drives a shaft 110, and the latter drives separating belts 20 through a belt 112 and a pulley fixed on the shaft 116 to which pulley 24 is also fixed. The shaft 116 also drives a belt 118 to drive the pulley 16 fixed on the shaft 120. Another motor 122 drives a pulley 124, belt 126 and pulley 128. Pulley 128 is fixed to pulley 130 to drive belts 42, the latter also being entrained about a pulley 132 and engaged by a take-up idler roller 134.

The checks are fed, as described above, in succession from the separating and feeding unit 10 to the synchronizer unit 28, and then in substantially a straight line to the left (as viewed in FIG. 1) until deflected into one of the stackers by a respective deflecting element 52. While being fed in said substantially straight line, the successive checks ordinarily travel at the cyclic rate of speed and with the lead edge of each check spaced a determined distance ahead of the lead edge of the next successive check. So long as each check is not oversize in the direction of feeding and is fed in timed relation, the successive checks will be fed in end to end spaced relation, that is, with the trail edge of each check spaced ahead of the lead edge of the next successive check. The discs 100 of the synchronizer unit 28 which carry the two sets of paddles 102 are driven at an angular speed proportional to the intended cyclic rate of feed of the checks. This speed is slightly slower than that at which the synchronizer disc 30 is driven. With proper feeding, each successive check is fed to the synchronizer unit 28 slightly late and is urged by the synchronizer disc 30 in the direction of feeding at a slightly greater rate than that at which the two sets of paddles 102 are moving with the result that the lead edge of each check moves into engagement with one of the sets of paddles whereupon the respective check assumes the speed of the set of paddles and slips slightly relative to the disc 30. Each one of the two sets of paddles 102 revolves about the shaft 98 once for each two cycles of the check feed. Accordingly, the successive checks are ordinarily fed very close to and ultimately in timed relation while traveling about the synchronizer disc 30, and then are fed in timed relation after leaving the synchronizer disc 30 until deflected by one of the deflecting elements 52. Occasionally, however, a mis-feed occurs and the present invention is directed to the detection of these mis-feeds.

In accomplishing mis-fed detection, the present invention can utilize document sensing units and magnetic timing units identical to those disclosed in the above-noted U.S. Patent No. 2,973,202. Referring to FIG. 1 in this regard, two magnetic timing units generally designated at 138 and 138*a*, respectively, are provided. These magnetic timing units are of conventional design and each includes a respective one of two magnetic devices 142 and 142*a*. Each of these magnetic devices includes a permanent magnet which produces a magnetic field within which an air gap and a coil are disposed. The magnetic timing units 138, 138*a* further include two buttons 144, 144 both of which are common to both of the timing units and both of which are formed of a ferrous material of high permeability. The buttons 144, 144 are mounted on the discs 100 which support the sets of paddles 102. As the discs 100 rotate, each of the buttons 144, is moved in succession through the air gaps of the magnetic devices 140, 140*a*. This induces an E.M.F. in the coil of the respective magnetic device which is manifested as a change in the voltage across electrical leads to the ends of the coil; this voltage change being in the form of a sine wave.

One or more photoelectric sensing units is associated with each of the magnetic timing units. In FIG. 1, each of the photoelectric sensing units generally designated at 146 is associated with the magnetic timing unit 138, and each of the photoelectric sensing units 146*a* is associated with the magnetic timing unit 138*a*. Each of the photoelectric sensing units 146 and 146*a* includes a lamp 148 which projects a beam of light across the check feed path at a light-sensitive device such as a photo-transistor 150. The voltage output of each photo-transistor 150 varies between two levels depending upon whether or not one of the checks obstructs that photo-transistor from the light beam projected by the respective lamp 148 associated therewith.

Figure 2:
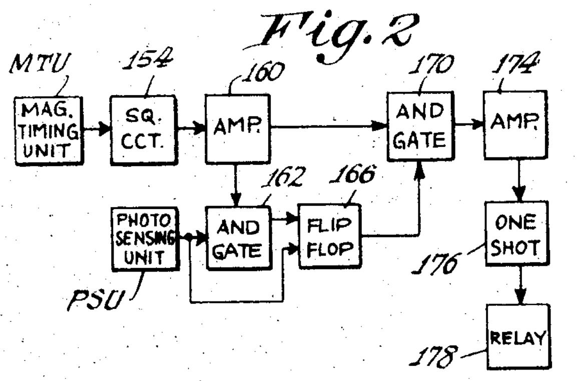
FIG. 2 is a block diagram of the electronic means of a mis-feed detecting system according to a first embodiment of the present invention.

For the purposes of description, the photoelectric sensing unit PSU in the electronic block diagram of the embodiment of FIG. 2 is representative of any one of the photoelectric sensing units 146 and 146*a* as shown in FIG. 1, and the magnetic timing unit MTU of FIG. 2 is representative of the respective one of magnetic timing units 138 and 138*a* of FIG. 1 associated therewith.

Figure 6:
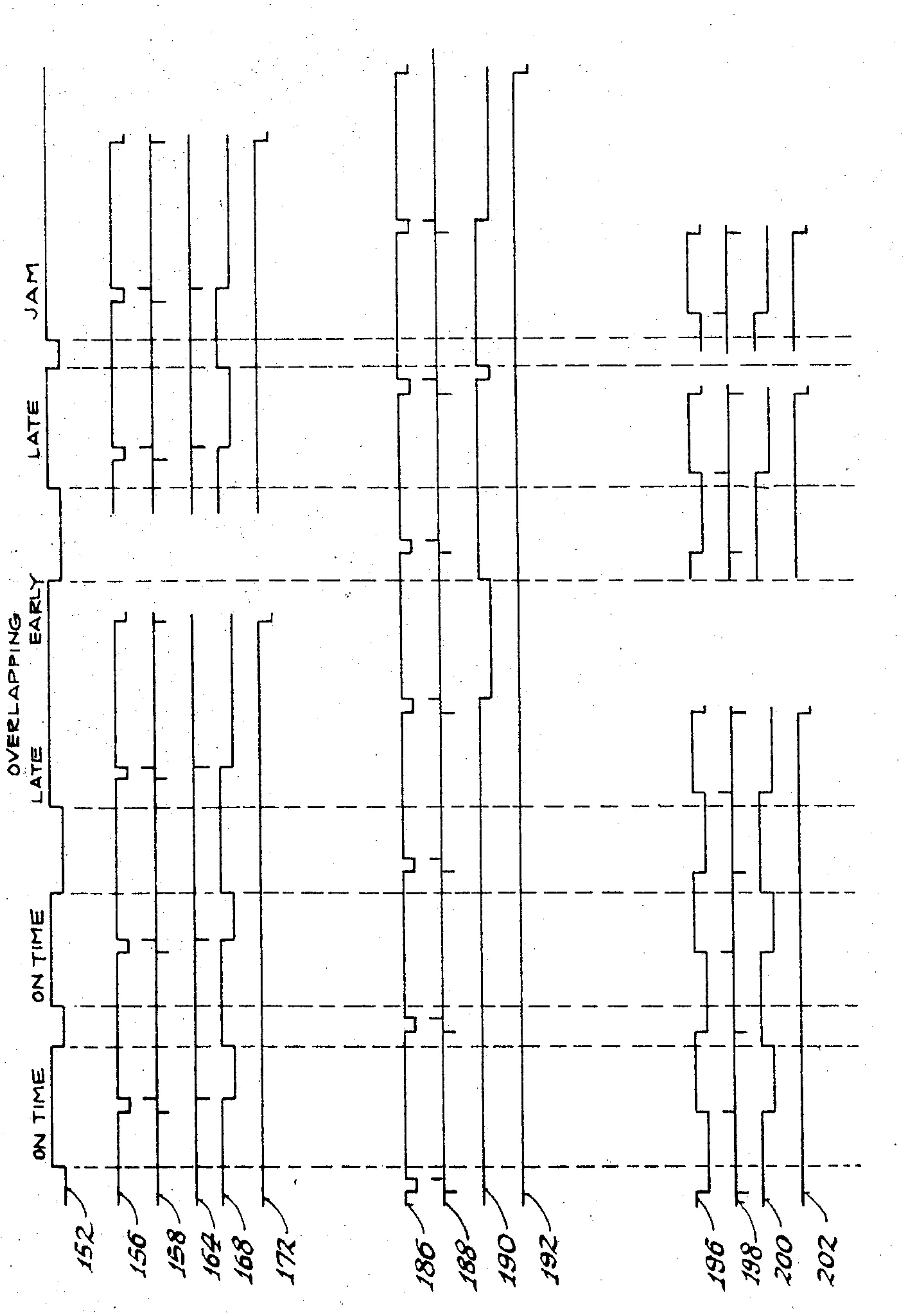
FIG. 6 is an electrical timing chart showing the pulse trains as they occur at respective locations within the block diagrams of FIGS. 2–4.

The output of the photoelectric sensing unit PSU is at one voltage level when the respective light beam is not interrupted by a check and is at a higher or more positive level when a check does interrupt the respective light beam. Referring to FIG. 6, the pulse train 152 is one such as would be produced by the sensing unit PSU if an on-time check were fed past this sensing unit followed in succession by an on-time check, a late check, an early check that overlaps or abuts the preceding late check, another late check and then a check which jams.

The trailing half of each sine wave output of the magnetic timing unit MTU is shaped by a squaring circuit 154 (such as a Schmidt trigger) whose output is a train of negative-going timing pulses as indicated at 156 in FIG. 6. Referring to FIG. 2, an amplifier 160 is associated with a differentiating network whereby the output of the squaring circuit 154 is differentiated and amplified to produce the spike pulse train 158. It will be clear from the wave-form chart of FIG. 6 that each timing pulse of the train 156 is, in effect, converted to a leading pulse and a trailing pulse. In this regard, the lead edge of each timing pulse of the train 156 is converted to a negative-going lead spike pulse, and the trail edge of each of these timing pulses is converted to a positive-going trail spike pulse. The trail spike timing pulses are spaced in time, each from the next, to occur once during the same point in each succeeding check feed cycle. Each lead spike timing pulse occurs after the next preceding trail spike timing pulse an amount of time just slightly less than that until the next succeeding lead spike timing pulse occurs.

An "and" gate 162 is connected as shown in FIG. 2 to produce an output pulse (see pulse train 164) when any pulse from the photoelectric sensing unit PSU (pulse train 152) is being produced simultaneously with a trail spike pulse from amplifier 160 (pulse train 158). This occurs each time a check being fed is at the sensing location of the sensing unit PSU when one of the trail spike timing pulses occurs. A flip-flop 166 of the so-called unsymmetrically triggered type is provided whereby it is set by a pulse from a first source and is reset by a pulse from a second source. The flip-flop 166 is arranged as shown in FIG. 2 such that it is set by any output pulse of the "and" gate 162 and is reset, once set, by the trail edge of the respective output pulse of the sensing unit PSU. Consequently, the flip-flop 166 is set whenever a check being fed is at the sensing location of the sensing unit PSU when one of the trail spike timing pulses occurs, and once this flip-flop is set it is reset whenever a space between checks is sensed at that sensing location. The flip-flop 166 produces a negative-going output pulse (see pulse train 168) while in the reset state. An "and" gate 170 is connected to produce an output pulse (see 172 in FIG. 6) whenever a lead spike pulse from the amplifier 160 occurs while the flip-flop 166 is producing an output pulse. It follows that once the flip-flop 166 is set, the "and" gate 170 will produce an output pulse if the next succeeding lead spike timing pulse occurs before the flip-flop is set. Accordingly, if after setting of the flip-flop, the sensing unit senses a space between checks being fed before the next succeeding leading spike timing pulse occurs, the "and" gate 170 will not produce an output pulse; otherwise, the "and" gate 170 will produce an output pulse. The output pulse by the "and" gate 170 is a mis-feed indicating signal.

The embodiment of FIG. 2 will now be described as it occurs when the feeding of checks is such that the pulse train 152 of FIG. 6 is produced by the sensing unit PSU, and when the magnetic timing unit MTU is arranged to produce a lead and trail spike timing pulse during a time interval when approximately the midpoint of each properly fed check is due at the sensing location of the sensing unit PSU. With the feeding of each of the first two (on-time) checks, the trail spike timing pulse of train 158 occurs while the sensing unit PSU is producing an output pulse (train 152) whereby the "and" gate 162 produces an output spike pulse (train 164) which sets the flip-flop 166. The resulting negative-going output pulse of the flip-flop 166 (train 168) terminates when this flip-flop is reset upon termination of the output pulse of the sensing unit PSU, as occurs when the trail edge of each on-time check clears the sensing location of the sensing unit PSU. Since the flip-flop 166 is reset before the next lead spike pulse of the train 158 occurs, the "and" gate 170 produces no mis-feed indicating pulse, and feeding of the two on-time checks continues uninterrupted.

The third check is fed sufficiently late and the fourth check sufficiently early that these two checks overlap each other; this being known as a "stream feed." Consequently, the sensing unit PSU fails to sense a space between these two checks. More specifically, the sensing unit PSU continues to produce an output pulse (and the flip-flop 166 remains in the set condition) from the time the leading edge of the third check is sensed until the next succeeding lead spike timing pulse (train 158) occurs, so that the "and" gate 170 receives pulses from the amplifier 160 and flip-flop 166 simultaneously. The "and" gate 170 responds by producing a mis-feed indicating pulse which is amplified by the amplifier 174. The lead edge of this amplified pulse triggers a one-shot multivibrator 176 whose output drives a relay 178. The relay 178 may be utilized to stop the feeding of the checks as disclosed in the above-noted patent to R. E. Schmeck et al.

The fifth check is not fed sufficiently late that it overlaps (or abuts) the sixth check, whereby the flip-flop 166, after being set, is reset before the next succeeding lead spike timing pulse occurs and no mis-feed indicating pulse is produced by the "and" gate 170.

Assuming that the sixth check jams (stops being fed for any reason such as meeting with an obstruction), the output pulse of the sensing unit PSU when this condition occurs, continues after setting of the flip-flop 166 until the next succeeding lead spike timing pulse occurs with the result that the "and" gate 170 produces a mis-feed indicating pulse.

With the embodiment of FIG. 2 as described above, it will be apparent, then, that this arrangement was not sufficiently sensitive that the fifth document which was fed late was detected as a mis-feed, but this arrangement was sufficiently sensitive to detect the overlapping third and fourth documents and the jam of the sixth document as mis-feeds. Also, from the above description of the embodiment of FIG. 2, it will be apparent that the magnetic timing unit MTU, the squaring circuit 154 and the amplifier 160 operate as a timing means for producing two timing pulses during each check feed cycle. The photoelectric sensing unit PSU operates to detect the presence and absence of a check at the sensing location of this sensing unit. The flip-flop 166 acts as a storage means for storing the information that the sensing unit PSU failed to sense a space between checks when the first one of the two timing pulses (the trailing positive-going spike pulse) occurred. The "and" gate 170 operates as a mis-feed indicating means which produces an output pulse when the flip-flop 166 fails to be reset, after being set, before the second one of the two timing pulses (the succeeding leading negative-going spike pulse) occurs.

Figure 3:
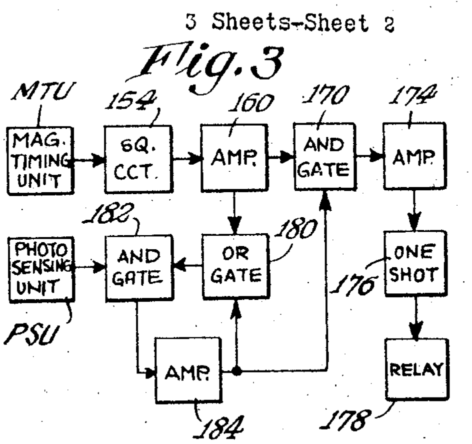
FIG. 3 is a similar view of the electronic means of a mis-feed detecting system according to a second embodiment of the present invention.

The embodiment of FIG. 3 differs substantially from that of FIG. 2 only in the provision of a different storage means. In this regard, the timing unit MTU, squaring circuit 154, amplifier 160, sensing unit PSU, "and" gate 170, amplifier 174, one-shot multivibrator 176 and relay 178 of the embodiment of FIG. 3 operate in a manner identical to their respective counterparts in the embodiment of FIG. 2. In the embodiment of FIG. 3, an "or" gate 180 passes each trail spike timing pulse from the amplifier 160 to the "and" gate 182. When the sensing unit PSU is producing an output pulse (indicating that a space between checks is not then at the sensing location) at the time that one of the trail spike timing pulses occurs, the "and" gate 182 begins to produce an output pulse. The output of the "and" gate 182 is amplified by an amplifier 184 and fed back to the "and" gate 182 through the "or" gate 180. Consequently, once the "and" gate 182 begins to produce an output pulse, this output pulse continues until the output pulse of the sensing unit PSU terminates. The amplified output of the "and" gate 182 is also fed to the "and" gate 170. When the "and" gate 170 receives a lead spike timing pulse from the amplifier 160 while receiving an output pulse from the amplifier 184, this "and" gate produces a mis-feed indicating pulse. It will be apparent that the storage means of the embodiment of FIG. 3 operates in a manner similar to that of FIG. 2 in that setting of the storage means is effected when a trail spike timing pulse occurs while the sensing unit is producing an output pulse, resetting of the storage means, once it is set, occurs when the output pulse of the sensing unit PSU terminates, and the storage means produces an output pulse so long as it is in the set condition. Accordingly, with the magnetic timing unit MTU and photoelectric sensing unit PSU producing the pulse trains 152 and 156 in FIG. 6 as described above, the embodiment of FIG. 3 operates in a manner similar to and with the same sensitivity as the embodiment of FIG. 2. With regard to the embodiment of FIG. 3, the output of the amplifier 160 will be the same as the pulse train 158 of FIG. 6, the amplified output of the "and" gate 182 will be the same as the pulse train 168, and the output of the "and" gate 170 will be the same as the pulse train 172.

The operation of the embodiment of FIG. 2 will now be described as it occurs under the same conditions as before (with the pulse train 152 of FIG. 6 being produced by the sensing unit PSU) except that the timing unit MTU is arranged such that a lead and trail timing pulse from the amplifier 160 occur when a space between checks being fed is due at the sensing location of the sensing unit PSU (rather than when the mid-point of each properly fed check is due at the sensing location as before). The output of the squaring circuit 154 will be the pulse train 186 in FIG. 6, and the output of the amplifier 160 (in association with a differentiating network) will be the pulse train 188. It is noted that the pulse trains 186 and 188 are identical but shifted in time relative to the pulse trains 156 and 158, respectively. As will become apparent, merely by so shifting the time at which the timing pulses occur, the sensitivity of the mis-feed detecting means is adjusted. It will be clear that this shifting of the timing pulses could be effected simply by adjusting the position of buttons 144, 144 on the discs 100. Comparing the pulse train 152 as produced by the sensing unit PSU with the pulse train 188, it is clear that no output pulse was being produced by the sensing unit PSU when the first two trail spike timing pulses of the train 188 occurred; this being the case because the first two checks were properly fed on-time and each of the two trail spike timing pulses therefore occurred at a time when a space between checks was at the sensing location. Consequently, no output was produced by the "and" gate 162 and the flip-flop 166 was not set. The output of the flip-flop 166 is depicted at 190 in FIG. 6. The third check, as indicated by the pulse train 152, was fed late so that, again, no output pulse was being produced by the sensing unit PSU when the third trail spike timing pulse occurred and the flip-flop 166 remained in the reset state. Since the third and fourth checks overlapped, the sensing unit PSU was producing an output pulse when the fourth trail spike timing pulse occurred whereupon the flip-flop 166 was set and began producing an output pulse (see pulse train 190). However, since the fourth check, even though it was early and overlapped the third check, cleared the sensing location of the sensing unit PSU before the next succeeding (fifth) lead spike timing pulse occurred, the flip-flop 166 was reset and no mis-feed indicating pulse was produced by the "and" gate 170 as indicated by the pulse train 192 in FIG. 6. The fifth check was fed sufficiently late that the sixth trail spike timing pulse occurred before the trail edge of this fifth check cleared the sensing location of the sensing unit PSU so that the flip-flop 166 was set. Shortly thereafter, the sensing unit PSU detected a space between the fifth and sixth checks whereupon the flip-flop 166 was reset before the next lead spike timing pulse occurred. When the sixth check jammed, the flip-flop 166 remained in the set state from the time the seventh trail spike timing pulse occurred until the next succeeding lead spike timing pulse occurred so that the "and" gate 170 produced a mis-feed output pulse (see the negative-going pulse at the end of line 192 in FIG. 6).

It is clear, then, that merely by shifting in time the timing pulses as initiated by the timing unit MTU, the sensitivity of the embodiment of FIG. 2 was decreased sufficiently that the overlapping third and fourth checks were not detected as a mis-feed but the sensitivity was not decreased to the point that the jam failed to be detected. Such an arrangement would be advantageous in a situation where such overlapping documents merely result in a mis-sort, and a mis-sort is preferred over stoppage of the check feeding means.

It is to be noted that with an apparatus which produces a mis-feed indicating signal whenever a space between cyclically fed checks fails to be sensed when due at the sensing location, such a mis-feed indicating signal would necessarily be produced by the overlapping third and fourth documents and no adjustment of parameters could avoid this. This is the case, of course, because such an apparatus requires that a space between checks be sensed once each cyclic feed interval and the overlapping third and fourth documents prevent the sensing of such a space for an interval substantially greater than one cyclic feed interval.

Under the same conditions as just described with respect to the embodiment of FIG. 2, the overall operation of the embodiment of FIG. 3 would be the same; the amplified output of the "and" gate 182 being the same as that indicated at 190 and the output of the "and" gate 170 being the same as that indicated at 192.

Figure 4:
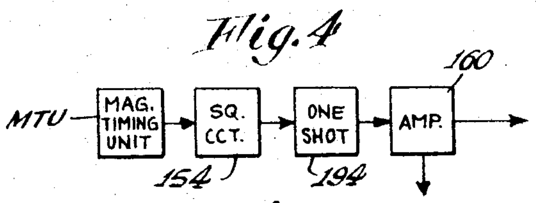
FIG. 4 is a fragmentary block diagram illustrating a modification applicable to the block diagrams of FIGS. 2 and 3.

FIG. 4 depicts a modification which can be applied to both of the embodiments of FIGS. 2 and 3 and by which the sensitivity of mis-feed detection can be adjusted in another way. As can be seen in FIG. 4, this modification involves the provision of a one-shot multivibrator 194 between the squaring circuit 154 and the amplifier 160. With this modification, the lead edge of each timing pulse as shaped by the squaring circuit 154, triggers the one-shot multivibrator 194 whereupon the latter produces an output pulse whose length can be chosen as desired. To demonstrate how the sensitivity can be adjusted, this modification will be described under the same conditions as last described (whereby the sensing unit PSU produces the pulse train 152, and the output of the squaring circuit 154 is as depicted at 186 in FIG. 6) with the added factor that the length of each output pulse of the one-shot multivibrator is approximately one-half of the cyclic time interval (i.e., one-half of the interval from the time the leading edge of one on-time check passes a given point along the feed path until the leading edge of the next succeeding check if on-time passes the same point). With the output of the squaring circuit 154 as shown at 186 in FIG. 6, the output of the one-shot multivibrator 194 will be as depicted at 196 and the output of the amplifier 160 in association with the differentiating network will be as shown at 198. The output of the storage means (i.e., the output of the flip-flop 166 in FIG. 2 and the amplified output of the "and" gate 182 in FIG. 3) will be as indicated at 200, and the mis-feed indicating output of the "and" gate 170 of both of FIGS. 2 and 3 will be as indicated at 202. Comparing the pulse trains 152 and 198, it can be seen that the storage means is set each time an on-time check is fed, but the storage means is reset before the next succeeding leading (negative-going) spike timing pulse occurs. When the overlapping third and fourth checks are fed, however, the storage means fails to be reset before the next succeeding (fourth) leading spike timing pulse occurs whereby the respective "and" gate 170 produces a mis-feed indicating output pulse. When a check is merely fed late, as is the fifth check, the storage means again fails to be reset before the next succeeding leading spike timing pulse occurs so that the "and" gate again produces a mis-feed indicating output pulse. From the previous description, it will be obvious that the jamming of the sixth check to be fed also causes the respective "and" gate 170 to produce a mis-feed indicating pulse. Accordingly, merely by adjusting the length of the timing output pulse of the squaring circuit 154, the sensitivity was increased such that not only were the overlapping third and fourth checks detected as a mis-feed along with the jammed sixth check but so also was the fifth check which was merely fed late.

Figure 5:
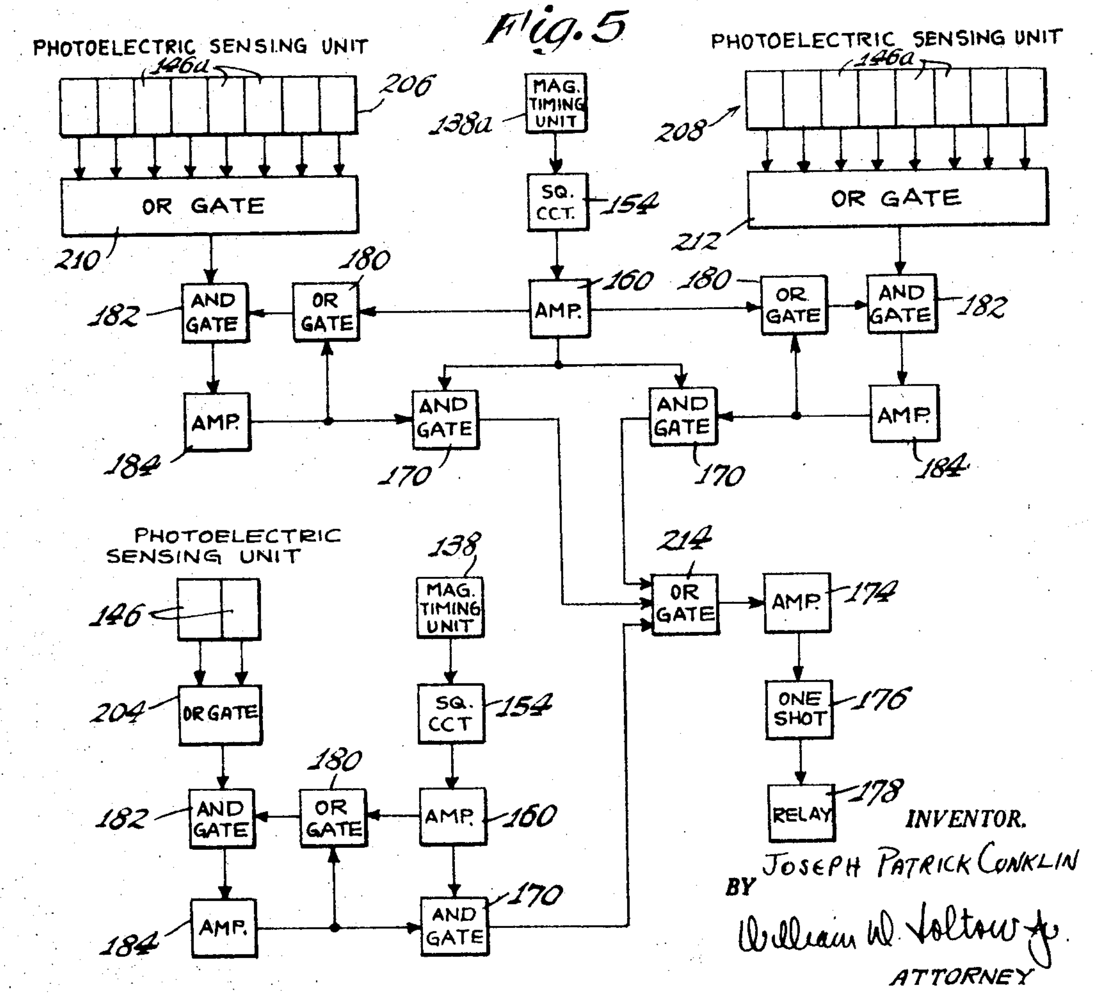
FIG. 5 is a block diagram of the electronic means of a mis-feed detecting system for sensing fed documents at a plurality of locations according to said second embodiment of the invention.

The respective embodiments of the invention will be as shown and described above with respect to FIGS. 2 and 3 when only a single photoelectric sensing unit is associated with a magnetic timing unit. Such an arrangement would be used, for example, when it could safely be assumed that once each of the successively fed checks moved past the sensing location of a single sensing unit without a mis-feed, it would continue to do so until its respective destination was reached. Frequently, however, such an assumption cannot safely be made. For this and other reasons, it is often necessary to provide a sensing unit at each one of a plurality of locations along the check feed path. If all of the sensing units can be located to sense at locations respectively spaced apart a multiple of the cyclic check feed interval (from the lead end of one on-time check to the lead end of the next succeeding check if the latter is on time), all of these sensing units can obviously be associated with a single timing unit. In FIG. 1, the photoelectric sensing units 146 are spaced apart one check feed interval, and the photoelectric sensing units 146*a* are spaced apart a multiple of the check feed interval from each other. Due to space limitations, however, neither of the sensing units 146 is spaced from any one of the sensing units 146*a* a multiple of this check feed interval. Consequently, the sensing units 146 are associated with the timing unit 138 which is separate from and out of synchronism with the timing unit 138*a* associated with the sensing units 146*a*. Referring to FIGS. 1 and 5, the two sensing units 146, 146 are associated with the magnetic timing unit 138, and the sensing units 146*a* are associated with the magnetic timing unit 138*a*. The output pulses of each of the sensing units 146, 146 pass through an "or" gate 204 to one of the "and" gates 182. The sensing units 146*a* are divided into two groups generally designated at 206 and 208, respectively; the output pulses of each of the former group passing through an "or" gate 210 and the output pulses of each of the latter group passing through an "or" gate 212, to a respective one of the "and" gates 182. It is noted that a single squaring circuit 154 and a single amplifier 160 as well as a single timing unit MTU are utilized for the timing pulses which operate in conjunction with the sensing signals produced by the two groups 206 and 208 of sensing units. It will be clear that when any one of the three "and" gates of FIG. 5 produces a mis-feed detecting pulse, this pulse will pass through an "or" gate 214, be amplified by the amplifier 174, and trigger the one-shot multivibrator 176 which drives the relay 178.

Referring to FIG. 5, it will be clear that a pulse will appear at the output of each one of the "or" gates 210 and 212 each time any one of the sensing units 146*a* connected thereto senses a check at its respective sensing location. This pulse will continue until all of the sensing units connected to the respective "or" gate fail to sense a check. It could occur, therefore, that one of the checks being fed was sufficiently ahead of time and another of the checks being fed was sufficiently behind time that the output pulse of the respective "or" gate continued long enough that a mis-feed indicating signal was produced even though neither of said two checks was individually out-of-time sufficiently to overlap any other check or otherwise to cause the production of a mis-feed indicating signal. Such a possibility is reduced, of course, by utilizing the two "or" gates 210 and 212, and connecting one-half of the sensing units 146*a* to each. Such a possibility could be eliminated altogether by connecting the output of each sensing unit 146*a* to a separate "and" gate 182 which is otherwise connected in the same manner as each of the "and" gates 182 in FIG. 5.

It will be clear from the above description that in each case two timing signals occurred during each check feed cycle; the first one of these two timing signals acted to set a storage means if a check was then located along the check feed path at the sensing location of the sensing means; once set the storage means was reset if the sensing means sensed a space between checks being fed past the sensing location before the second one of the two timing signals occurred; and a mis-feed indicating signal was produced if the storage means failed to be reset before said second one of the two timing pulses occurred. Stated otherwise, a mis-feed indicating signal is produced each time the sensing means continuously senses the presence of a document at the sensing location from the time the first one of the two timing signals occurs until the second one of the two timing signals occurs.

Since many changes can be made in the embodiments and the modification thereof as particularly described and shown herein without departing from the scope of the invention, it is intended that these embodiments and the modification thereof be considered as exemplary and that the invention not be limited except as warranted by the following claims. By way of example, it will be clear to those with only ordinary skill in the art that equivalent timing and document sensing means could be substituted for the magnetic timing units and photoelectric sensing units, respectively, as are described herein.

What is claimed is:

1. In an apparatus for successively feeding documents along a document feed path in end to end spaced relation, and having means operating in uniform timed cyclical sequence to feed one document during each cycle and establish a document feed cycle, a mis-feed detecting system comprising:

sensing means for sensing the presence and absence of a document at a predetermined location along said document feed path and providing corresponding presence and absence indicating signals;

cyclical timing means operatively connected to said feeding means for producing serially a first timing signal and a second timing signal during each document feed cycle;

means operatively connected to said sensing means and said cyclical timing means to produce a continuous signal actuated by the presence of both said presence signal from said sensing means and said first timing signal and said continuous signal continuing thereafter only during the continued presence of said presence signal;

and mis-feed indicating means operatively connected to said continuous signal means and said cyclical timing means to produce a mis-feed indicating signal, responsive to the concurrence of said second timing signal and said continuous signal.

2. In an apparatus for successively feeding documents along a document feed path in end to end spaced relation, and having means operating in uniform timed cyclical sequence to feed one document during each cycle and establish a document feed cycle, a mis-feed detecting system comprising:

sensing means for sensing the presence and absence of a document at a predetermined location along said document feed path and providing corresponding presence and absence indicating signals;

cyclical timing means operatively connected to said feeding means for producing serially a first timing signal and a second timing signal during each document feed cycle;

bistable storage means having set and reset positions operatively connected to said sensing means and said cyclical timing means to be set when a first timing signal occurs during a presence signal, and to be reset by said absence signal, said storage means providing a continuous signal in the set position;

and mis-feed indicating means operatively connected to said continuous signal means and said cyclical timing means to produce a mis-feed indicating signal, responsive to the concurrence of said second timing signal and said continuous signal.

3. In an apparatus for successively feeding documents along a document feed path in end to end spaced relation, and having means operating in uniform timed cyclical sequence to feed one document during each cycle and establish a document feed cycle, a mis-feed detecting system comprising:

sensing means for sensing the presence and absence of a document at a predetermined location along said document feed path and providing corresponding presence and absence indicating signals;

cyclical timing means operatively connected to said feeding means for producing serially a first timing pulse and a second timing pulse at predetermined respective times during each document feed cycle;

bistable settable storage means operable to produce a storage pulse only while in the set state;

said storage means being operatively connected to said sensing means and to said cyclical timing means to be set whenever a presence signal is being produced at the time said first timing pulse occurs;

said storage means being further operatively connected to said sensing means to be reset, once set, by said absence signal;

and an "and" gate operatively connected to said storage means and to said cyclical timing means for producing a mis-feed indicating pulse, responsive to the concurrence of said storage pulse and said timing pulse.

4. A mis-feed detecting system for use with an apparatus including means for successively feeding documents along a document feed path in end to end spaced relationship and first timing means connected to a feeding means for initiating each successive document feed of said feeding means, and a document feed cycle defined by the time interval between successive initiation of said feeding means by said first timing means:

sensing means for sensing the presence or absence of a document at a predetermined location along the document feed path and providing a corresponding presence indicating signal and absence indicating signal;

second timing means connected to said first timing means for producing a first and second timing signal, at predetermined times during each said document feed cycle;

bistable storage means having a set and reset condition, corresponding set and reset inputs, and an output for providing a signal when in the set state;

an "and" gate having a first input connected to said sensing means and a second input connected to said second timing means and an output connected to said set input of said bistable storage means for placing said bistable storage means in the set state in response to the concurrent occurrence of a presence indicating signal and a first timing signal;

means connecting said sensing means to said reset input of said bistable storage means for placing said bistable storage means in the reset state in response to a document absence indicating signal;

a second "and" gate, a mis-feed indicating means, having an input connected to said second timing means and another input connected to the output of said bistable storage means and an output connected to said mis-feed indicating means for energizing said mis-feed indicating means in response to the concurrent occurrence of a set state signal from the output of said bistable storage means and said second timing signal to indicate a mis-feed.

References Cited by the Examiner

UNITED STATES PATENTS

| | | | |
|---|---|---|---|
| 3,046,538 | 7/1962 | Pedersen | 340—259 |
| 3,114,902 | 12/1963 | Tanguy | 340—259 |
| 3,136,423 | 6/1964 | Delplace | 340—259 |

NEIL C. READ, *Primary Examiner.*

R. M. GOLDMAN, *Assistant Examiner.*